United States Patent
Haugh et al.

(10) Patent No.: US 7,287,077 B2
(45) Date of Patent: Oct. 23, 2007

(54) RESERVATION OF TCP/UDP PORTS USING UID, GID OR PROCESS NAME

(75) Inventors: Julianne Frances Haugh, Austin, TX (US); Richard Perry Youngman, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 10/636,983

(22) Filed: Aug. 7, 2003

(65) Prior Publication Data
US 2005/0044227 A1 Feb. 24, 2005

(51) Int. Cl.
G06F 15/173 (2006.01)
(52) U.S. Cl. ..................... 709/225
(58) Field of Classification Search ......... 709/225; 714/18
See application file for complete search history.

(56) References Cited

U.S. PATENT DOCUMENTS

| | | | | |
|---|---|---|---|---|
| 5,488,686 | A * | 1/1996 | Murphy et al. | 715/753 |
| 6,212,511 | B1 * | 4/2001 | Fisher et al. | 707/1 |
| 6,598,082 | B1 * | 7/2003 | Douglis et al. | 709/227 |
| 6,804,509 | B1 * | 10/2004 | Okon et al. | 455/414.1 |
| 6,901,426 | B1 * | 5/2005 | Powers et al. | 709/203 |
| 6,954,443 | B2 * | 10/2005 | Forstadius et al. | 370/331 |

* cited by examiner

Primary Examiner—David Y. Eng
(74) Attorney, Agent, or Firm—Diana R. Gerhardt; Dillon & Yudell LLP (57) ABSTRACT

A method for enhancing port allocation procedures in a computer network by reserving specific ports to particular users and processes. Access protocol for ports are modified to enable a system administrator to defined/pre-select particular users and processes that may access the specific ports. A table structure is provided with the list of users and processes with bind authority for the particular port. When a bind request is received the ID of the user or process is confirmed against those within the table of the requested port. Bind access is provided only when the user ID or process ID matches one that is within the table. The port is allocated to the user/program until the user/process is complete, and other requests for access to the port are ignored until final completion of the ongoing process, even when a temporary disconnect of the port occurs.

24 Claims, 4 Drawing Sheets

RESERVATION OF TCP/UDP PORTS USING UID, GID OR PROCESS NAME

BACKGROUND OF THE INVENTION

1. Technical Field

The present invention relates in general to computer networks and more specifically to network ports utilized to provide access to resources on computer networks. Still more particularly, the present invention relates to a method and system for reserving ports for accessing computer network resources.

2. Description of the Related Art

Computer networks, their hardware configuration and the protocols by which the network connection and communications are managed are well known in the computer arts. One method utilized to harmonize the various types/implementations of computer networks is the assignment of specific port numbers for connecting a client system to a particular resource available on the network server.

A port number is a way to identify a specific process to which an Internet or other network message is to be forwarded when the message arrives at the server. Within the commonly utilized Transmission Control Protocol (TCP) and User Datagram Protocol (UDP), a port number is a 16-bit integer that is included in the header appended to a data unit. This port number is passed logically between client and server transport layers and physically between the transport layer and the Internet Protocol (IP) layer.

When a first application on the client system initiates a communication with a second application at the server (i.e., the host computer), the first application specifies that specific second application in each data transmission by using the port number associated with that second application. When the first application initiates the connection, the application selects or "binds" to the TCP port number of the second application. Responsively, when the second application is started and listens for incoming connection requests, the second application also binds to a TCP port number that corresponds to the service being provided. The TCP port numbers essentially help to designate queues into which arriving data packets are placed for service by an application running on that system.

For example, when a client is requesting a file be served from the server via File Transfer Protocol (FTP), the Transmission Control Protocol (TCP) software layer in the client system identifies and sets the port number of 21 (which by convention is associated with an FTP request) in the 16-bit port number integer that is appended to the request. A system call referred to as a "bind" is then made to associate a local network address that includes the port number with a socket. At the server, the TCP layer reads the port number of 21 and automatically forwards the request to the FTP program on the server.

Some services or processes have conventionally assigned permanent port numbers. These are known as well known port numbers. In other cases, port numbers are assigned temporarily (for the duration of the request and its completion) from a range of assignable port numbers. These port numbers are called ephemeral port numbers.

The well-known port numbers are reserved for use by the application end points that communicate using the Internet's TCP or the UDP. Each kind of application has a designated (and thus "well-known") port number. For example, a remote job entry application has the port number of 5; the Hypertext Transfer Protocol (HTTP) application has the port number of 80; and the Post Office Protocol Version 3 (POP3) application, commonly used for e-mail delivery, has the port number of 110. Other examples include mail having port number of 25, telnet having port number of 23, and file transfer protocol (FTP) having port numbers of 20, 21, etc.

When a request is made by a client system for a particular port number the port number is included in every request to that particular server. Typically multiple clients or applications are requesting access to a single port number simultaneously and are allocated the port number on a first-to-request basis. That is, the first client that requests access to the port number is typically allocated the resources of the port number. When programs in user space are created, the programs utilize pre-agreed port numbers. For example, a server program, typically begins with port number 4000, and when the server program is initiated, the program automatically builds control information and labels the port 4000.

Some applications are hard-coded to use specific port number(s). On most systems, a well-known port number can only be used by a system (root) process or by a program being run by a privileged user. Thus, client software is run to a specific port all the time. Thus the client accessing a particular service must connect to the specific port on the server. Alternatively, a manufacturer may pick a port number to assign to a server-client pair that is sold to a customer. The client and server then communicate exclusively via that port number.

There are typically competing resources for access to the ports. The port is allocated to users, groups, and/or processes on a first come first serve basis and once a port is accessed the port remains unavailable to another user/group/process until the first session is terminated (voluntarily or involuntarily) or is completed. When a competing resource requests access to the port, the other resource is prevented from accessing the port.

There is currently no method to reserve a port number for a specific user, group, or application. If an application is stopped or aborts, the port number is released and may bind to the same or another application. On large scale servers that serve multiple clients with competing requests for access to particular applications/ports, the port assigned to a first server program that is prematurely terminated may be re-assigned to a second server program before the first server program can be restarted. The first server program is thereby prevented from restarting and completing in a timely manner.

For example, if the application of the first server program has a problem, the port is released (session temporarily halted). At this point any other program is able to utilize the port although the first server program still needs the port. The first server program is thus forced to wait until the port is released from the second client. This method of allocating ports to competing resources on a first come first server basis is detrimental for "priority" applications that are processing-time-sensitive, are expensive and/or have a higher priority than other applications. Delaying subsequent access to the port by forcing the priority application of the first server program to wait until the port is again available is not ideal. The only alternative currently is for the administrator to find the process that is using the required port and killing the process before trying to restart the priority application.

One additional problem with current protocols that control port usage involves the utilization of privileged/reserved ports. Certain ports, known as "reserved ports" are configured to require privilege to bind to that port even though the application itself requires no additional privilege. There are certain services that are privileged and other services that only require access to the reserved port. These other services only require the specific privilege to connect to the reserved ports, and when that privilege is provided, the access to the privileged port opens the server to attacks by persons who should not have been provided such privileged access.

Each user/system/application with permission to access the reserved port is provided with a privilege. The person or entity with a particular privilege is provided un-restricted access to the port (i.e., privilege is given) and once access is allowed, the person or entity has complete/full access to the server system.

As stated above, some of the applications given the privilege do not really require a privilege because they only need to extend access to the port. When the enhanced privilege access is compromised, a greater compromise of the security features of the entire system occurs. Attacks on the system may occur once the user/program binds to the port.

In light of the foregoing limitations with current port allocation protocols/methods, the present invention recognizes that it would be desirable to provide a method and system for eliminating the port-availability wait-time inherent with current systems when specific priority applications/users request a bind to a particular port following a interruption/disconnection of a previous bind of the application/user. A method and system that allocates specific ports to specific priority applications/users to substantially eliminate resource contention for binding with the server application would be a welcomed improvement. It would further be desirable to provide a method and system that eliminates the security threats to server systems when privilege access is provided for connection to general applications that ultimately enables full access once the bind occurs on a privileged port. These and other benefits are provided by the invention described herein.

SUMMARY OF THE INVENTION

Disclosed are a method and system for enhancing port allocation procedures in a computer network by reserving ports to particular users and processes. Port control applications are modified to enable a system administrator to define/pre-select particular users and processes that can access the specific ports. In one embodiment, a table structure is associated with each port and includes the list of users and processes with bind authority for the particular port. When a bind request is received at the server, the port control application extracts the ID of the user or process and checks the ID against those within the table of the requested port. Bind access is provided only when the user ID or process ID matches one that is within the table. Bind permission determination of the invention includes the "user", "group", and "other" binding permissions as well as the application name for the port.

In one embodiment, the system administrator modifies parameters within the configuration file to set-up the port allocation procedure. When the system is booted-up the configuration file places the correct parameters in the particular configuration locations so that the OS and the network protocol software responds to the bind requests for particular ports according to the method described by the invention. Also, the system administrator is permitted to edit and update the configuration file on-the-fly (during operation).

When a disconnect or interruption occurs during a bind requested by the authorized first user or process, that user or process is allowed to re-establish the bind without having to wait on competing resources that are requesting access to the port when the competing resources are determined to be less important or un-authorized (by the system administrator).

By granting exclusive ownership of a port to a user or group identity, the system removes the need for applications to have privilege solely for the purpose of binding to the port. Unauthorized users and groups remain prohibited from binding to the port, thereby maintaining the security of the system.

According to another embodiment, certain additional restrictions are provided, which make it easier for authorized applications to access particular ports and which place control over port allocation protocol in the hands of the system administrator. With the greater control provided to the system administrator, established rules that no longer provide the most desired allocations of port resources are overridden. In one implementation, privilege programs may be rewritten to no longer require privilege.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
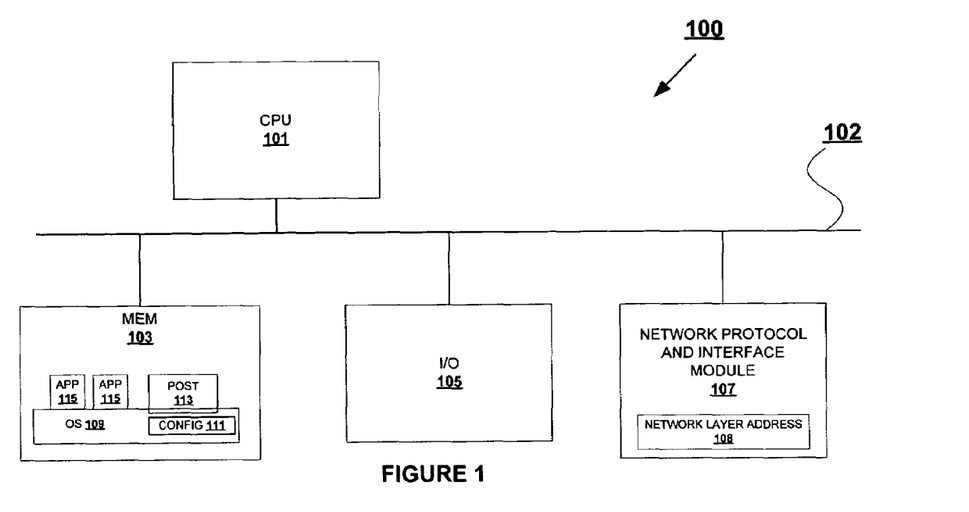
FIG. 1 is a block diagram illustrating major components of a data processing system within which the features of the present invention may advantageously be implemented.

With reference now to the figures, and in particular with reference to FIG. 1, there is illustrated a data processing system (DPS) within which various features of the present invention may advantageously be implemented. DPS 100 includes a central processing unit (CPU) 101 coupled to memory 103 and input/output (I/O) module 105 via interconnect (or system bus) 102. Also coupled to the other components via interconnect 102 is network interface module 107, which has an associated network layer address 108 to which packets of information, transferred on a computer network, described below.

In addition to the hardware components described above and others that are not shown, DPS 100 comprises various software programs, which are primarily stored in memory. As illustrated, memory 103 comprises operating system (OS) 109, which includes a configuration file 111 (referenced below) and a Power On Self Test (POST) application 113. Memory 103 also comprises multiple applications 115, which in the described embodiment includes applications for implementing the various processes provided by the server DPS. Notably, additional software code may reside within NIM 107 for completing the table updates, ID checks, etc. required to set up and access the application, respectively.

In a network environment, DPS 100 may be utilized as either a client or server and would also contain the required software for operating the system as either type of application. When utilized as a client system, the client system is coupled to a computer network 22 via network interface module 107. Network interface module 107 has an associated layer address 108. The network layer address therefore allows remote system nodes to communicate with one another through the passing of packets of information across the computer network. Each packet includes a header that contains the network layer addresses of the originating processor node and the destination processor node.

Figure 2A:
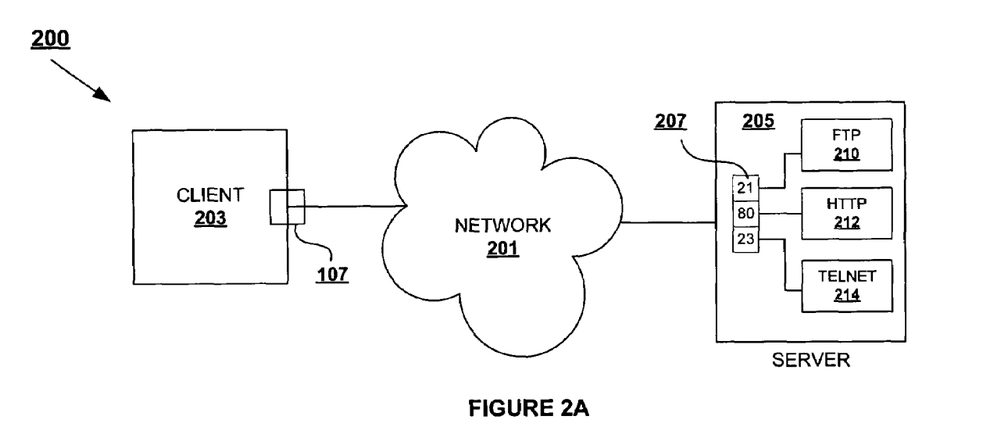
FIG. 2A is a diagram illustrating a basic network and network server with ports according to one embodiment of the invention.

FIG. 2 illustrates a basic network comprising at least one DPS 100 operating as a client system and/or a server. Network 200 comprises a network backbone 201, which connects client system 203 to server 205. Actual configuration and/or makeup of network backbone is not relevant to the invention and thus network backbone 201 is provided solely to illustrate the connection of client system 203 to server 205 via the bind process that involves a network port hosted by server 205.

As depicted within server 205, several ports 207 are available for completing a bind with (or connection to) client system 203. Included among these ports 207 are FTP port, labeled port 21, HTTP port, labeled port 80, and Telnet port, labeled port 23. As further illustrated, linked to each of these ports 207 is a supporting software application, including FTP 210, HTTP 212, and Telnet 214. The supporting software applications comprise configuration software running on server 205 that provides the connection and communication features for the particular service according to the present invention.

Although not shown in FIG. 2, server 205 is assumed to comprise the additional software that enables the system administrator's input of both the bind-access and privilege configuration options/selections. The additional software enables the features of the invention to be programmed into server 205 by a system administrator and then automatically implemented during operation.

Figure 3:
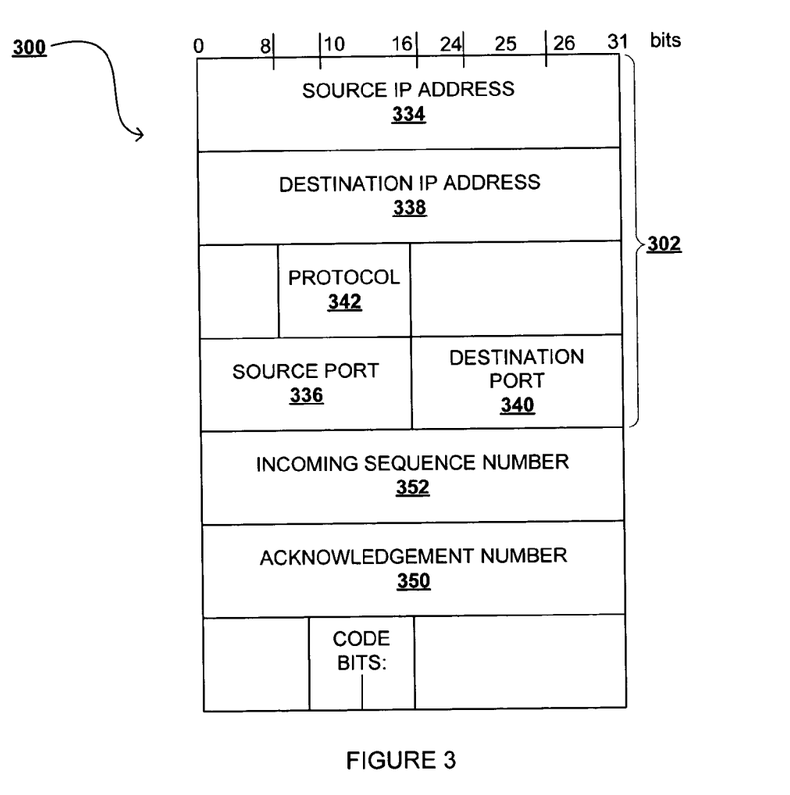
FIG. 3 is a block diagram of a TCP/IP header of a data packet transmitted on the network of FIG. 2A with port numbers in accordance with one embodiment of the invention.

Referring now to FIG. 3, there is illustrated one configuration of a TCP/IP header, which is created with the specific port information required to complete the bind operation initiated by a client system. TCP/IP header 300 comprises multiple sections/portions, each having a unique functionality within the TCP. In a first portion 302 of TCP/IP header 300, connection identification data are identified within several fields. The source IP address field 304 identifies the thirty-two-bit network layer address of the client system sending the associated data packet. The destination IP address field 308 identifies the thirty-two-bit network layer address of the intended destination server. Eight-bit Protocol field 342 specifies the protocol being utilized to complete the transmission. Finally, source port field 336 and destination port field 340 identifies the TCP port number associated with the application on the client system that generated and is sending the data packet and the corresponding application on the server that is receiving the packet and completing the bind. TCP/IP header 300 further includes an incoming sequence number field 352 and an acknowledgment, or outgoing sequence number field 350, used to order data packets that are associated with a fragmented data transfer. The header also includes a number of code bits (not enumerated).

According to the invention, the TCP port number within the destination port field 340 identifies to the server which application/service is requested to complete the bind. That port number is retrieved from the TCP/IP header along with the source IP address (utilized to identify the user/process) and the corresponding table of reserved users/processes is accessed from the configuration file of the particular port control application (as described below).

The present invention provides the ability to reserve TCP/UDP ports for specific users, groups, named applications and combinations thereof at the server. The invention enables a system administrator to define who/what resource can bind itself to a port, and the invention then provides automated/dynamic methods to control which server programs are allowed to bind the port. The invention allocates specific port numbers for access by only specific users and/or application occurs within the server based on system needs (determined by the system administrator). With these "high priority" or authorized accesses that require specific ports, the invention eliminates the contention for access by reserving the ports to pre-determined userIDs, groupIDs, etc. Bind system software of the server's network adapter is modified to include a check of the access permission table associated with the particular port whenever a port is requested.

In another implementation of the invention, certain global privileges required to access specific ports (i.e., the enhanced privilege access) are removed/redefined for access to non-privilege applications on the server. That is, server programs that are not privileged are not provided with privileged access. Rather these programs are placed on general access ports. This feature of the invention provides enhanced server security by removing the ability of users/processes to access privileged areas of the server by merely logging in via a privileged bind associated with non-privileged applications.

One embodiment of the invention provides a network option via a command that initiates/enables the features of the invention when entered by the system administrator. The network option will enable simple commands and programming interfaces for setting port ownership to a specific user, group, or named process or combination thereof. Additional commands and programming interfaces may retrieve this information for one or more ports.

Figure 2B:
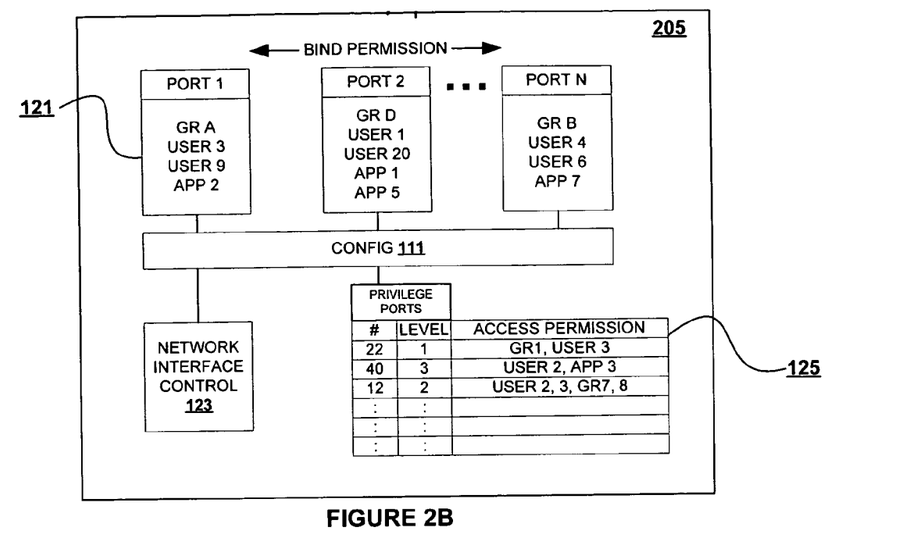
FIG. 2B is a block diagram illustrating the internal configuration file and associated tables by which the bind permissions are defined according to one embodiment of the present invention.

The port-reservation information is input in a configuration file by the system administrator. The information may also be entered into and stored in tables that are accessible by the configuration file in one embodiment (see FIG. 1B, described below). The configuration file will be read at system startup and the port reservation info is stored in the kernel for quick access via bind. Also a command is provided to allow the system administrator to make changes to the configuration file and also update the configuration file in the kernel during run time.

FIG. 2B illustrates additional internal components of server 205 including one implementation by which the access-reservation information (or bind permissions) is maintained within server 205. Each block illustrated within server 205 represents a software module (or data), that each interacts at some level (indicated by the connecting lines) to provide the functional aspects of the invention. In addition to configuration file 111, server 205 comprises a plurality of access-reservation tables 121, each corresponding to a particular one of the ports provided/supported by server 205. Within each table 121 is a list of users, groups, and applications/processes that may access that particular port. The tables are generated by the system administrator during the initial set-up of the ports and are subsequently maintained by the system administrator. Additionally, the tables are dynamically accessed by configuration file during a bind request for the particular port.

Also shown within server 205 and connected to configuration file 111 is network interface control 123 (i.e., the network protocol module which is an extension of the kernel), which receives the bind request and controls access to the particular port once the bind is established. The concept of a connection between various software modules is understood to refer to a "call to a routine" or similar methods known in the art.

Finally, as will be further described below, server comprises privilege allocation tables 125. Privilege allocation tables 125 are a means of tracking which ports are privileged and should be restricted from access by general applications and which ports should not be privileged because of the general information provided by the supporting server program.

Figure 4A:
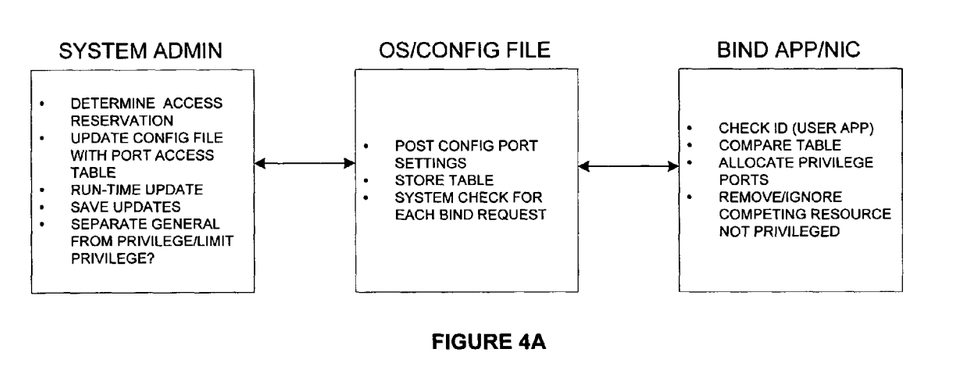
FIG. 4A is a process diagram indicating the grouped sequence of operations at different stages of implementation of one embodiment of the invention.

As stated above, implementation of the invention involves a series of administrative steps and a series of automated, programmed steps, as delineated in FIG. 4A, which is now described. Each block identifies the functions that occur at that point of the implementation, although some functions may overlap between blocks. Thus, for example, system administrator determines the access-reservations, provides updates to the access-reservations, as necessary, and divides up the privilege port access permissions from the general port access permissions. Notably, according to this embodiment, the system administrator is responsible for building the set of tables/data structures. However, the invention may provide some additional automation that only requires the administrator to seed the tables with known users/processes that would require such access-reservation during the initial set-up of the port on the server.

According to the invention, a system administrator may add or remove permissions. The server system then performs the checks for access based on the ID of the requester or application requesting access. In one embodiment a ROOT (i.e., super privilege user) is provided full authorization, including multiple simultaneous accesses. Unlike in the prior art where only the ROOT had access to specific ports, the invention enables other (explicit) access based on which program/user/etc. is provided within the configuration table in addition to the root. The root maintains its historical (implicit) access.

The system administrator builds the configuration file with the table and is able to change or add the table entries (i.e., update security and authorization parameters) during operation. Only the system administrator is provided access, i.e., there no general user access to the configuration file. The kernel/system code accesses the configuration file and prevents against tampering by these general users. Additionally, the system administrator is able to turn off the access permissions utilizing a specific command/configuration option set by the system administrator.

The OS and configuration file provide the POST during which the configuration file sets up the kernel with parameters required for the port numbers, etc. The OS is also indirectly involved in completing the check for access-reservation of a bind request. This latter feature is the primary responsibility of the bind application and/or network interface controller (NIC) (i.e., the network protocol which is an extension of the OS kernel in AIX). The NIC is also responsible for substantially eliminating the "competition" for the resource once an approved bind is in progress.

Figure 4B:
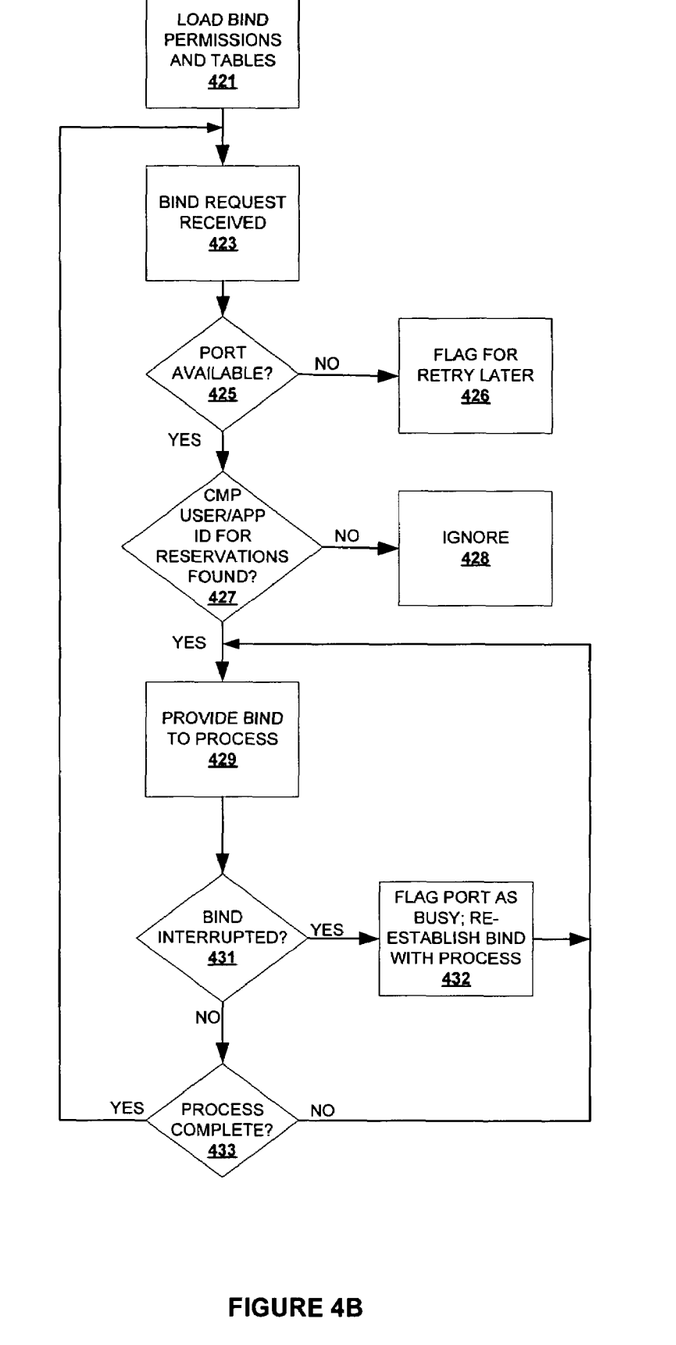
FIG. 4B is a flow chart depicting the process of completing a bind with specified permissions according to one embodiment of the present invention.

FIG. 4B provides a flow chart of the process by which verification of access-reservation for a particular port and subsequent maintenance of a bind with the approved user/process is completed according to one embodiment. The process begins as depicted at block 421 with a configuration file loading the bind permissions and tables (i.e. access-reservation). From a technical standpoint, a port number is associated with the socket. The port number/socket at which access authorization is completed, and a bind is completed utilizing logical software connection between socket data structure and port number on the server. Returning to the flow chart, a bind request is received as indicated at block 423, and a determination is made at block 425 whether the port requested is available. This determination is required since multiple users/processes may be authorized to bind to the particular port and the port may be currently busy. When the port is not available, the system from which the request was generated is provided a busy/retry later response as shown at block 426. Alternatively, the client system may be set to automatically retry the request until a bind is established.

When the port is available, the user/process ID is compared with those within the allowed/reserved group for that port, and a determination made at block 427 whether a reservation was found (i.e., a match of the user/process ID). Two possible implementations are then possible. In a first static implementation, a query is made within the table, which is loaded in the kernel of the host during boot time. That is, the table data is loaded when the port is configured during boot up of the host. Then, the configuration file is read. In the second dynamic implementation, the kernel actually accesses a separate table to obtain the authorization information.

If no reservation is found, the bind request is ignored as shown at block 428. In one alternate embodiment, a message is then generated and issued to the client system indicating that the requested access was not permitted. If, however, a reservation is confirmed for that user/process, bind access is provided as shown at block 429. The server control program monitors the bind and determines at block 431 when the bind is interrupted before completion of the process. When the bind is interrupted, the application immediately flags the port as busy, stores the bind parameters, including the source IP address and source port number, etc., and waits to re-establish the bind with that process as indicated at block 432. Notably, as part of that sequence, the server control program also rejects any request from another process/user for access to the port while the initial process is incomplete. Thus, the first-come first-served basis for reserving ports is modified whenever a premature termination of the bind is registered. In one embodiment, a pre-set time count is provided, and the process is made to re-issue the request to re-instate the bind within that time. If the time count expires, the server control program then releases the port to the next-in-line request from an authorized user/application/program.

Returning to the sequence of FIG. 4, the server control program monitors for the completion of the process and determines at block 433 when the process has completed. When the process completes, the bind is undone/severed and the port is released for the next-in-line request (or highest priority request) as shown at block 435.

The invention thus provides a system and method for controlling access to TCP/UDP ports based on characteristics of the application and/or users making the access request. The invention allows a system administrator to reserve ports and insure that the port will only be utilized by a pre-specific user, group, named application, or combination thereof.

The invention also provides a means to improve security for applications, which require privilege only to bind to a reserved port, by eliminating the need for privilege where privilege is not required. By granting exclusive ownership of a port to a user or group identity, the system removes the need for applications to have privilege solely for the purpose of binding to the port. Unauthorized users and groups remain prohibited from binding to the port, thereby maintaining the security of the system.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a computer system having a network communication port, a memory, a processor, an operating system (OS), and at least one server program accessible via said communication port, a method for reserving said communication port, comprising:
    enabling a bind between said communication port and a first one of a plurality of users/applications that may request access to said first server program at the communication port, wherein said bind is only enabled when the first user/application is pre-authorized to bind to that communication port;
    reserving the communication port for completion of a process by the first user/application with bind authority; and
    preventing access to said communication port by a second user/application until the process initiated by the first user/application is completed;
    wherein when the bind between the first user/application is interrupted before completion of the process, said communication port is reserved for re-connection by said first user/application.

2. The method of claim 1, further comprising:
    in response to access to said communication port requiring specific authorization, such that the communication port is selectively accessible, associating a selected server program among a plurality of available server programs with said communication port, wherein only the selected server program associated with said communication port is made accessible through a bind to said communication port;
    wherein only a user/application with prior authorization may bind to the communication port and access the selected server program associated with the communication port.

3. The method of claim 2, said associating further comprising:
    receiving inputs from a system administrator to update a network protocol that controls port access permissions;
    prompting for entry of credential information from said system administrator, wherein access to update said port access permissions is only provided when correct credential information is first received;
    automatically updating said port access permissions according to said inputs in response to authentication of the credential information.

4. The method of claim 1, further comprising:
    maintaining an access permission table in which specific access permissions for the communication port is provided with pre-set user/application authorizations; and
    responsive to a receipt of a port access request:
        comparing an Identification (ID) of a requesting source against entries within said access permission table for a match of said ID; and
        enabling port access only when said comparing results in a match of the ID within the access permission table of the requested port;
        wherein restricting access to a server program accessible via the communication port is provided by identifying within the access permission table which users, processes, and applications may access the communication port from which that server program is made accessible.

5. The method of claim 4, further comprising:
    loading port reservation parameters associated with a configuration file of an operating system (OS) of said computer system during system startup;
    storing said parameters within an OS kernel
    automatically checking said parameters in response to receipt of a port access request to determine whether access to the requested port is authorized for the requesting user/application;
    accessing said table via said configuration file, wherein said table is automatically accessed when a port access request is received; and
    enabling on-the-fly updates to said port reservation parameters by entry of inputs by a system administrator during operation of said computer system.

6. The method of claim 1, further comprising:
    generating a table of entries including users, processes, and applications that are authorized to bind to said communication port in order to access a privileged server program that is only accessible via the communication port; and
    providing access to the privileged server program via the communication port for only those entries identified within said table, wherein access is denied for all other requesting users, processes, and applications;
    wherein when said computer system comprises multiple communication ports, said table is generated to include a list of authorized users, processes, and applications with bind authorization for privileged ones of said communication ports providing access to respective privileged server programs;
    wherein restricting access to a server program is provided by identifying within the table which users, processes, and applications may access the communication port from which that server program is made accessible.

7. The method of claim 1, wherein said computer system is a server, said communication port is a server-level port by which specific server programs may be accessed, requests of a user/application is provided by a client system that accesses said server via a network, and said method comprises:

receiving a first bind access request from a first user/application of a first client;

providing a first bind access to said first user/application in response to the first user/application having authority to bind to the communication port;

receiving a second bind access request from a second user/application with authority to bind to the communication port;

determining whether a first process being performed during the first bind access is complete;

providing a second bind access to said second user/application only when said first bind access initiated by the first user/application is complete, wherein when the first bind access of the first user/application is interrupted before completion of the first process, said communication port is reserved for re-connection by said first user/application and withheld from being re-assigned to the second user application for a pre-set period.

8. The method of claim 1, further comprising:

detecting the first bind is broken/interrupted before completion of the first process;

re-establishing a first bind access when said first bind access is broken prior to said port being released by said first user/application; and retrying a second access request for that communication port until said first bind process is complete, wherein said first bind process is complete when said port is released by said first user/application or when a pre-determined time elapses following an interruption of the first bind without the first bind being re-established.

9. The method of claim 1, further comprising:

flagging the communication port as busy, wherein received requests from other user/applications for access to bind to the communication port are rejected;

storing bind parameters of the bind with the first user/application to support seamless re-establishment of the bind, wherein said bind parameters include the source IP address and source port number;

monitoring for a re-establishment of the bind with the first user/application within a pre-established time period; and releasing the communication port to bind to another user/application when the pre-established time period expires without the first user/application re-establishing the bind.

10. In a networked computer system having a processor, memory, network ports, an operating system (OS), a network protocol, and a plurality of server programs that enabled a bind to the network ports, a system for reducing processing delays or processes begun on a port being requested by multiple processes, said system comprising:

means for enabling a bind between said communication port and a first one of a plurality of users/applications that may request access to said communication port, wherein said bind is only enabled when the first user/application is pre-authorized to bind to that communication port;

means for reserving the communication port for completion of a process by the first user/application with bind authority; and means for preventing access to said communication port by a second user/application until the bind process initiated by the first user/application is completed;

wherein when the bind between the first user/application is interrupted before completion of the bind process, said communication port is reserved for re-connection by said first user/application.

11. The system of claim 10, further comprising:

in response to requiring specific authorization to access said communication port, such that the communication port is selectively accessible, means for associating a selected server program among a plurality of available server programs with said communication port, wherein only the selected server program associated with said communication port is made accessible through a bind to said communication port;

wherein only a user/application with prior authorization may bind to the communication port and access the selected server program associated with the communication port.

12. The system of claim 10, wherein further, responsive to a receipt of a port access request, said system further comprising:

means for maintaining an access permission table in which specific access permissions for the communication port is provided with pre-set user/application authorizations; and responsive to a receipt of a port access request:

means for comparing an Identification (ID) of a requesting source against entries within said access permission table for a match of said ID; and means for enabling port access only when said comparing results in a match of the ID within the access permission table of the requested port;

wherein restricting access to a server program accessible via the communication port is provided by identifying within the access permission table which users, processes, and applications may access the communication port from which that server program is made accessible.

13. The system of claim 12, further comprising:

means for loading port reservation parameters associated with a configuration file of an operating system (OS) of said computer system during system startup;

means for storing said parameters within an OS kernel;

means for automatically checking said parameters in response to receiving a port access request to determine whether access to the requested port is authorized for the requesting user/application;

means for accessing said table via the configuration file, wherein said table is automatically accessed when a port access request is received; and means for enabling on-the-fly updates to said port reservation parameters by entry of inputs by a system administrator during operation of said computer system.

14. The system of claim 10, wherein said means for associating further comprises:

means for generating a table of entries including users, processes, and applications that are authorized to bind to said communication port in order to access a privileged server program that is only accessible via the communication port; and means for providing access to the privileged server program via the communication port for only those entries identified within said table, wherein access is denied for all other requesting users, processes, and applications;

wherein when said computer system comprises multiple communication ports, said table is generated to include a list of authorized users, processes, and applications with bind authorization for privileged ones of said communication ports providing access to respective privileged server programs;

wherein restricting access to a server program is provided by identifying within the table which users, processes, and applications may access the communication port from which that server program is made accessible.

15. The system of claim 10, said means for associating further comprising:

means for receiving inputs from a system administrator to update a network protocol that controls port access permissions;

means for prompting for entry of credential information from said system administrator, wherein access to update said port access permissions is only provided when correct credential information is first received;

means for automatically updating said port access permissions according to said inputs in response to authentication of the credential information.

16. The system of claim 10, wherein said computer system is a server, said communication port is a server-level port by which specific server programs may be accessed, requests of a user/application is provided by a client system that accesses said server via a network, and said system comprises:

means for receiving a first bind access request from a first user/application of a first client;

means for providing a first bind access to said first user/application in response to the first user/application having authority to bind to the communication port;

means for receiving a second bind access request from a second user/application with authority to bind to the communication port;

means for determining whether a first process being performed during the first bind access is complete;

means for detecting the first bind is broken/interrupted before completion of the first process;

means for re-establishing a first bind access in response to interrupting said first bind access prior to said port being released by said first user/application; and means for retrying a second access request for that communication port until said first process is complete, wherein said first process is complete when said port is released by said first user/application or when a predetermined time elapses following an interruption of the first bind without the first bind being re-established;

means for providing a second bind access to said second user/application only when said first bind access initiated by the first user/application is complete, wherein when the first bind access of the first user/application is interrupted before completion of the first process, said communication port is reserved for re-connection by said first user/application and withheld from being re-assigned to the second user application for a pre-set period.

17. The system of claim 10, further comprising:

means for flagging the communication port as busy, wherein received requests from other user/applications for access to bind to the communication port are rejected;

means for storing bind parameters of the bind with the first user/application to support seamless re-establishment of the bind, wherein said bind parameters include the source IP address and source port number;

means for monitoring for a re-establishment of the bind with the first user/application within a pre-established time period; and means for releasing the communication port to bind to another user/application when the pre-established time period expires without the first user/application re-establishing the bind.

18. A computer readable medium having program instructions that when executed on a processor of a computer system having a network communication port, a memory, a processor, an operating system (OS), and at least one server program accessible via said communication port, the program instructions complete the functions of:

enabling a bind between said communication port and a first one of a plurality of users/applications that may request access to said communication port, wherein said bind is only enabled when the first user/application is pre-authorized to bind to that communication port;

reserving the communication port for completion of a process by the first user/application with bind authority;

preventing access to said communication port by a second user/application until the process initiated by the first user/application is completed; and wherein when the bind between the first user/application is interrupted before completion of the bind process, said communication port is reserved for re-connection by said first user/application.

19. The computer readable medium of claim 18, further comprising program instructions for:

in response to access to said communication port requiring specific authorization, such that the communication port is selectively accessible, associating a selected server program among a plurality of available server programs with said communication port, wherein only the selected server program associated with said communication port is made accessible through a bind to said communication port.

20. The computer readable medium of claim 19, wherein said instructions for associating further comprises program instructions for:

maintaining an access permission table in which specific access permissions for the communication port is provided with pre-set user/application authorizations; and responsive to a receipt of a port access request:

comparing an Identification (ID) of a requesting source against entries within said access permission table for a match of said ID; and enabling port access only when said comparing results in a match of the ID within the access permission table of the requested port.

21. The computer readable medium of claim 19, said instructions for associating further comprising program instructions for:

generating a table of entries including users, processes, and applications that are authorized to bind to said communication port in order to access a privileged server program that is only accessible via the communication port; and providing access to the privileged server program via the communication port for only those entries identified within said table, wherein access is denied for all other requesting users, processes, and applications;

wherein when said computer system comprises multiple communication ports, said table is generated to include a list of authorized users, processes, and applications with bind authorization for privileged ones of said communication ports providing access to respective privileged server programs; and wherein restricting access to a server program is provided by identifying within the table which users, processes, and applications may access the communication port from which that server program is made accessible.

22. The computer readable medium of claim 18, further comprising program instructions for:

loading port reservation parameters associated with a configuration file of an operating system (OS) of said computer system during system startup;

storing said parameters within OS kernel;

automatically checking said parameters in response to receipt of a port access request to determine whether access to the requested port is authorized for the requesting user/application;

accessing said table via the configuration file, wherein said table is automatically accessed when a port access request is received; and enabling on-the-fly updates to said port reservation parameters by entry of inputs by a system administrator during operation of said computer system.

23. The computer readable medium of claim 18, wherein said computer system is a server, said communication port is a server-level port by which specific server programs may be accessed, requests of a user/application is provided by a client system that accesses said server via a network, and said program instructions comprises instructions for:

receiving a first bind access request from a first user/application of a first client;

providing a first bind access to said first user/application in response to the first user/application having authority to bind to the communication port;

receiving a second bind access request from a second user/application with authority to bind to the communication port;

determining whether a first process being performed during the first bind access is complete;

detecting the first bind is broken/interrupted before completion of the first process;

re-establishing a first bind access in response to an interruption of said first bind access prior to said port being released by said first user/application;

retrying a second access request for that communication port until said first process is complete, wherein said first bind process is complete when said port is released by said first user/application or when a pre-determined time elapses following an interruption of the first bind without the first bind being re-established and providing a second bind access to said second user/application only when said first bind access initiated by the first user/application is complete, wherein when the first bind access of the first user/application is interrupted before completion of the first process, said communication port is reserved for re-connection by said first user/application and withheld from being re-assigned to the second user application for a pre-set period.

24. The computer readable medium of claim 18, further comprising program instructions for:

flagging the communication port as busy, wherein received requests from other user/applications for access to bind to the communication port are rejected;

storing bind parameters of the bind with the first user/application to support seamless re-establishment of the bind, wherein said bind parameters includes the source IP address and source port number;

monitoring for a re-establishment of the bind with the first user/application within a pre-established time period; and releasing the communication port to bind to another user/application when the pre-established time period expires without the first user/application re-establishing the bind.

* * * * *